Nov. 11, 1958 C. V. FRENCH ET AL 2,859,484
METHOD OF MANUFACTURING FIBER-CEMENT SHEETS
Filed May 25, 1954
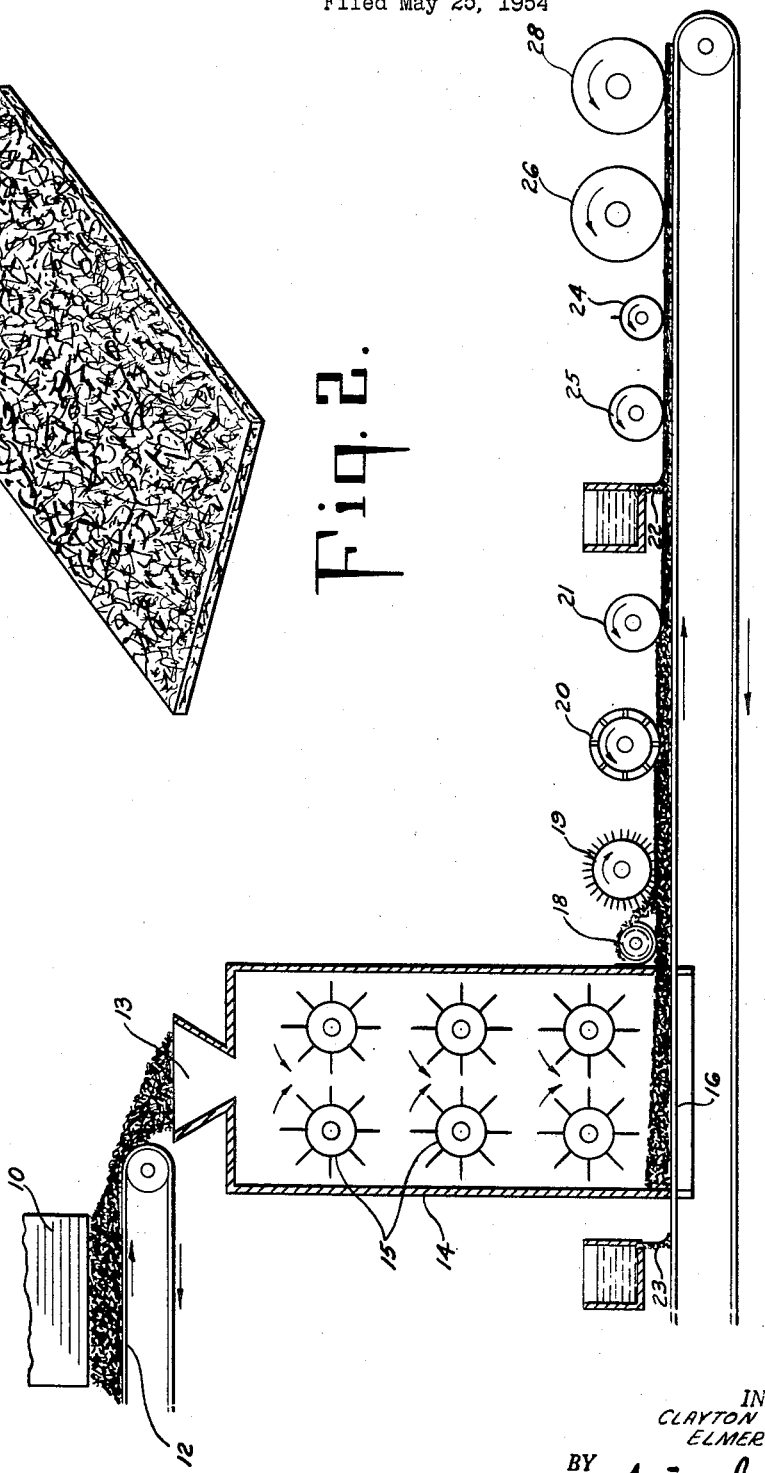
INVENTORS.
CLAYTON V. FRENCH
ELMER R. IHNE
BY
ATTORNEY

United States Patent Office 2,859,484
Patented Nov. 11, 1958

2,859,484

METHOD OF MANUFACTURING FIBER-CEMENT SHEETS

Clayton V. French and Elmer R. Ihne, Somerville, N. J., assignors to Johns-Manville Corporation, New York, N. Y., a corporation of New York Application May 25, 1954, Serial No. 432,245

15 Claims. (Cl. 18—60)

This invention relates to a method of manufacturing fiber-cement sheets, and more particularly to a method of manufacturing sheets containing asbestos fiber and cement for use as structural building materials.

The herein-disclosed invention is an improvement upon the manufacturing procedure outlined in U. S. Patent No. 2,230,880 issued to George B. Brown, February 4, 1941. The procedure outlined in this patent has formed the basis for the current large scale manufacture of what are conventionally termed dry-pressed asbestos cement shingles, siding units, etc. While the procedure has met with such substantial commercial success, it has limitations which prevent its utility in manufacturing certain types of dry process products and various problems have arisen in manufacture utilizing the steps outlined. As suggested in the Brown patent, the commercial products formed in accordance with that procedure normally are subjected to steam curing. While a fiber-cement sheet can be obtained by the therein described process employing a normal air curing rather than autoclaving, no commercially acceptable smooth surfaced sheet can be obtained and granules cannot successfully be applied to the surface of such a normal cured product. Additionally, the products formed in accordance with the Brown procedure are subject to chipping, breakage and the like during handling and fracture when subjected to a blow while spanning framing members.

As is normal with such fiber-cement sheets, attempts to increase the modulus of rupture of these products result in a corresponding increase in their modulus of elasticity. Since the modulus of elasticity is a function of stress divided by the elongation of the product, higher values of modulus of elasticity are an indication of lower flexibilities and are, therefore, disadvantageous. Furthermore, since the impact resistance of such a product is a function of the square of the modulus of rupture divided by the modulus of elasticity, increases in the modulus of elasticity adversely affect the impact resistance of the products.

A further limitation of the Brown process is in the relatively close controls which must be kept upon the amount of water added to the deposited dry web. Occasionally the characteristics of the furnish laid on the conveyor described therein will vary due to variations in the condition of raw materials, mixing techniques, etc. Relatively slight changes in the uniformity of the furnish make it necessary to vary the amount of water applied to the web in order to obtain products with consistently uniform properties. Such close control renders the operating procedure somewhat difficult.

Accordingly, it is an object of this invention to provide a method of manufacturing fiber-cement sheets which will result in an increase in strength and flexibility, and hence impact resistance, of such sheets.

It is another object of this invention to provide a method of manufacturing fiber-cement sheets which may be normally cured and which may be provided with a smooth or granuled surface.

It is a further object of this invention to provide a method of manufacturing fiber-cement sheets in which a furnish containing relatively high proportions of asbestos fiber may be employed.

It is an additional and more specific object of this invention to provide a method of manufacturing fiber-cement sheets which has greater flexibility than those heretofore outlined, and in which the amount of hydrating water laid on a web may be maintained substantially constant and need not be varied for normal variations in furnish characteristics.

The invention will be more fully understood and further objects and advantages will become apparent when reference is made to the following detailed description of a preferred embodiment of the invention and to the accompanying drawings, wherein:

Fig. 1 shows diagrammatically a side elevation of an apparatus which may be utilized with this invention;

Fig. 2 shows a perspective view of the finished fiber-cement sheet.

In general, the preferred method of manufacturing fiber-cement sheets having the aforementioned improved characteristics comprises forming an intimate minglement of cement particles and staple reinforcing fiber, which may also contain reactive silica and an aggregate, dispersing the thus obtained intimate minglement in air suspension, depositing the suspended minglement upon a felting member to form a web, adding substantially sufficient water to the web to hydrate the cement, compressing the layer to form the desired article by subjecting the web to an initial press roller which exerts approximately 200 to 2,000 lbs. per lineal inch and then to a subsequent press roller which exerts approximately 1,500 to 6,000 and preferably 3,000 to 6,000, lbs. per lineal inch, and then curing the thus formed and densified "green" sheet by hardening the cement content therein with either an air curing or steam curing procedure. In establishing the particular pressures for both rolls it is necessary that the initial press roller exert substantially less pressure than the second, and preferably the force exerted by the second roll will range between 3 and 15 times that exerted by the initial roll. If a veneered or granule surfaced sheet is desired the veneer and/or granules may be applied to the surface of the sheet prior to its entry into the pressure consolidating station.

The formulation of the furnish composition of staple reinforcing fiber, cement, and, preferably, reactive silica and filler or aggregate may be substantially varied and improved results can be obtained in dry pressed products employing conventional fiber-cement compositions in the herein defined procedure. For use in this invention the staple reinforcing fiber content of the formulation may range between approximately 15% to 50% by weight of the formed uncured compressed and densified or "green" sheet, and the preferred fiber is a virgin asbestos fiber of the 5 or 6 grade, as classified under Q. A. M. A. Standard Quebec Screen Test. Prior to this invention the maximum fiber which could be employed in successfully manufacturing dry process sheets did not exceed approximately 30%, due to the inability to get the hydrating water to penetrate through the sheet during the forming period while operating at practical machine speeds. As hereinafter indicated substantial advantages can be obtained in products containing higher amounts of fiber, the manufacture of which is only possible when employing the procedure described herein.

The total binder ingredients in the furnish may comprise approximately 35% to 60% by weight of the "green" sheet, and may be all cement particles. For products which are steam cured, the binder preferably comprises cement in amount approximately 20% to 50% by weight of this sheet and reactive silica in amount up to approximately 30% by weight of the sheet and preferably in amount about 50–60% by weight of the cement. Preferably Portland cement is employed, though, as disclosed in the Brown patent, other hydraulic cements such as a calcium aluminate cement may be used. If desired, fillers such as ground rock, silica, shingle scrap, etc., may be employed in the furnish in amount up to 40% by weight of the "green" sheet.

Obviously sufficient water should be available in the product when curing to result in hydration of substantially all the cement particles present at that time. In the case of a normal cured product, all of the water necessary for such hydration must be added to the web during its formation. In the case of steam cured products, however, all of this water need not be added since some can be obtained from the steam present in the autoclave. In order to obtain the preferred products of this invention, water in amount sufficient to hydrate substantially all cement present is used. Water in amount at least approximately 7% by weight of the "green" sheet must be added during the forming procedure in any event. The maximum amount of water which may be applied is dependent upon the pressure applied as the ultimate step in the forming procedure. When the second press roll exerts the minimum of 1,500 lbs. per lineal inch, as much water as 25% by weight of the "green" sheet may be used. When pressures of 3,000 lbs. per lineal inch are employed with the second press element, the minimum pressure required to secure adequate granule adhesion, water in amount up to approximately 20% by weight of the "green" sheet may be used. It is only with the use of the double press procedure of this invention that such relatively large quantities of water can be incorporated into the "green" sheet. With prior procedures only about 10% water could be incorporated in the sheet when operating at conventional machine speeds. This amount is often insufficient to hydrate the cement present and hence is insufficient to develop as strong a bond as could be developed with the amount of cement used.

Conventional fiber-cement veneers may be employed in this procedure. Normally such veneers comprise 5 to 20% by weight of fine asbestos fiber, 20 to 50% by weight of cement, and the remainder pigments and fillers. Granules of quartz, graystone, etc., of conventional types are suitable for forming granule surfaced sheets in accordance with this invention.

The apparatus diagrammatically illustrated in the drawings is that of the preferred equipment utilized in carrying out the steps of the improved method of manufacture of this invention. As Fig. 1 clearly indicates, the apparatus up to the press section is generally similar to that disclosed in the aforementioned patent to George B. Brown. Referring particularly to Fig. 1, a mixture of fiber, cement particles and preferably aggregate particles, formulated as indicated above, is fed to hopper 10. From the hopper the mixture is conveyed by any suitable means, such as conveyor 12 through opening 13 into the fluff box 14.

As illustrated in the drawing, the fluff box 14 is used to disperse the intimate minglement in air suspension in order to allow uniform deposition or felting of the material on felting member 16. Fluff box 14 preferably contains convenient dispersing means such as spike rollers 15 arranged in pairs and usually rotated towards each other and, at points between any given pair of rollers, in the direction of the felting member 16. With such rotation, the air-suspended material is driven by spike rolls 15 in the direction of the felting member 16. The spike rollers may be driven at various speeds, depending in part upon the size of rollers and the degree of packing desired on the felting member. As in the example set forth in the Brown patent, with spike rollers of an overall diameter of 7–11" the rotation may be at the rate of about 200–1000 R. P. M.

Fluff box 14 opens at the bottom above the felting member 16 which preferably comprises a moving conveyor of substantially impermeable fabric such as a rubber or rubberized canvas of the type commonly utilized on a dry process asbestos and cement shingle machine. In its upper reach, this belt moves to the right in the arrangement shown in Fig. 1. Upon emerging from fluff box 14, the belt passes under a picker roll 19 of a conventional type, which levels off the top of the deposited material and throws any excess back into a screw or scroll conveyor 18 which carries it off. The excess air carried in the relatively thick deposited layer is removed by any suitable means, as by pressing thereagainst a member such as roller 20. The face of this roller is preferably constructed with closely spaced perforations in order to allow the air to escape without having the roller pick up any of the felted materials. The layer of asbestos and cement mixture is then pressed under a roller 21 for moderate compression and further shaping.

Water to hydrate the cement content of the felted layer is applied by any suitable means. As illustrated, water is preferably added to the belt prior to its entry into fluff box 14 by overflow vat 23, and additional water is applied to the densified layer after its emergence from the nip of roll 21 by overflow vat 22. As indicated in the Brown patent, the water may be added in an equivalent manner by feeding it to the raw materials entering through inlet 13. The amount of water is normally sufficient to hydrate the cement, but should be insufficient to cause the wet materials to flow on the conveyor belt under the influence of gravity alone.

Subsequent to the application of water on the upper surface of the web, the felted layer is passed under a cutting roll 24, advantageously after having been first subjected to additional smoothing and light compressing by roller 25.

After cutting, the segments are then subjected to the press section which, as illustrated, is composed of two press rollers, 26 and 28. As indicated hereinbefore, the initial press roll 26 exerts a force of approximately 200 to 2,000 lbs. per lineal inch, and the second press roll 28 exerts a force of approximately 1,500 to 6,000, and preferably 3,000 to 6,000, lbs. per lineal inch.

After densification and compression, the "green" fiber-cement sheet is removed from the machine to a supporting element such as a pallet, and is allowed to stand for a sufficient time for the cement to take its initial set. After set, the sheet is preferably trimmed to the desired configuration and is then cured as, for instance, by long standing at atmospheric conditions or by steam curing for a few hours, for example, 6 hours at 100 p. s. i. steam temperatures.

The fiber-cement sheets formed in accordance with the procedure hereinbefore disclosed have advantageous properties not heretofore attained in sheets formed in accordance with prior procedures, including the procedure outlined in the aforementioned Brown patent. The sheets of this invention, both in the "green" and in the cured state, have a substantially higher modulus of rupture, and yet have a substantially greater amount of flexibility. These characteristics are surprising since, in common sheet manufacture, an increase in the modulus of rupture has associated with it an undesirable decrease in sheet flexibility. Obviously, the greater strength and greater flexibility of the sheet formed in accordance with this invention give it better handleability during the manufacturing procedure as, for example, during its removal from the machine, and during shipping and application, and a greater strength when applied in its intended structural position.

To illustrate the characteristics of the product, it may be pointed out that the commercial dry-pressed products formed prior to this invention had a modulus of rupture of approximately 2,500 to 3,000 lbs./sq. in., while the products which can be made by use of this invention exhibit moduli of rupture up to approximately 4,000 to 4,500 lbs./sq. in. Prior products also exhibit a modulus of elasticity of 2 to 2.5 million lbs./sq. in. while the double pressed products made in accordance with this invention exhibit moduli of elasticity ranging between 1.8 and 2.3 million lbs./sq. in. Hence, advantageously, there is not the normal characteristic increase in modulus of elasticity with increase in modulus of rupture. From these figures can be determined the impact resistance of the sheets, which figure is an index proportional to the area under the stress-strain curve of shingles tested on a 10" span. Prior products exhibited an impact resistance of 10 to 15 inch lbs. per inch of thickness, while the products made in accordance with this invention exhibit an impact resistance of 20 to 30 inch lbs. per inch. These maximum values are partly due to the use of furnishes with higher amounts of fiber, which amounts can be successfully used only when employing the double pressing procedure of this invention.

It is also an important characteristic of the process of this invention that the fiber content of the furnish has a substantial effect upon the modulus of rupture of the product. It was characteristic in manufacturing prior products, including those manufactured according to the process defined in the aforementioned Brown patent, that variations in fiber content, at least within the limits normally employed, had little effect upon the modulus of rupture of the sheet. With the procedure described herein, however, the fiber content does have a substantial effect on the modulus of rupture and substantial increases in modulus of rupture can be gained by increasing the fiber content, or a modulus of rupture comparable to that of the products heretofore obtained may be secured from furnish compositions having a lower fiber content. Since asbestos fiber is a substantially expensive ingredient, this can result in a substantial saving in material costs.

It is to be understood that the advantages of the double pressing procedure of this invention may be obtained in the manufacture of any conventional fiber-cement sheets capable of manufacture by what is conventionally termed the "dry press process." Fiber-cement sheets formed in accordance with this invention may be provided with a fiber-cement surfacing or veneer of the type and in the manner disclosed by the patents to Otis et al. No. 2,446,782 and McQuade No. 1,945,004. In such processes a veneer of fiber and cement is applied to the sheet after an initial compressing as by roller 21, and, preferably, the sheet is also surfaced with granules. If a surface design effect is desired, grained rollers, such as those disclosed by McQuade, may be employed in the process in the manner disclosed therein.

Instead of using a dry veneer such as disclosed in these procedures, it is possible to surface the sheet with a wet veneer, as, for example, a water-laid web of asbestos-cement such as that obtained from a conventional Hatschek type wet machine as disclosed in Patent No. Re. 12,594. The wet veneer may be applied to the surface of the web prior to its subjection to the press rollers. Such a procedure is advantageously used to obtain an extremely smooth surfaced asbestos-cement sheet. The surface of such a sheet closely resembles the wet process asbestos-cement sheets conventionally obtained when employing such a Hatschek wet machine procedure. As is apparent, substantial commercial advantages are secured by manufacturing such a sheet by a dry press process employing a wet veneer web. If desired, granules may also be applied to the wet veneer prior to entry of the web to the press station.

It will be understood that the details given herein are for the purpose of illustration, not restriction, and that variations within the spirit of the invention are intended to be included in the scope of the appended claims.

What we claim is:

1. In the method of manufacturing fiber-cement sheets which comprises forming a web upon a felting member from an intimate mixture in air suspension, said web comprising cement particles, staple reinforcing fiber, and water, compressing and densifying said web, and then curing the thus obtained densified web by hardening the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

2. In the method of manufacturing granule surfaced fiber-cement sheets which comprises forming a web upon a felting member from an intimate mixture in air suspension, said web comprising cement particles, staple reinforcing fiber, and water, applying granules to the surface of said web, compressing and densifying said web and then curing the thus obtained densified web by hardening the cement therein, the improvement which comprises compressing and densifying said web at a plurality of stages wherein the initial stage exerts upon said web approximately 200 to 2,000 lbs. per lineal inch and the subsequent stage exerts upon said web approximately 3,000 to 6,000 lbs. per lineal inch.

3. In the method of manufacturing fiber-cement sheets which comprises forming a web upon a felting member from an intimate mixture in air suspension, said web comprising cement particles, staple reinforcing fiber, and water in amount approximately 7 to 25% by weight of the uncured densified web, compressing and densifying said web, and then curing the thus obtained densified web by hardening the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

4. In the method of manufacturing granule surfaced fiber-cement sheets which comprises forming a web upon a felting member from an intimate mixture in air suspension, said web comprising cement particles, staple reinforcing fiber, and water in amount approximately 7 to 20% by weight of the uncured densified web, applying granules to the surface of the web, compressing and densifying said web and then curing the thus obtained densified web by hardening the cement therein, the improvement which comprises compressing and densifying said web at a plurality of stages wherein the initial stage exerts upon said web approximately 200 to 2,000 lbs. per lineal inch and the subsequent stage exerts upon said web approximately 3,000 to 6,000 lbs. per lineal inch.

5. In the method of manufacturing fiber-cement sheets which comprises forming a web upon a felting member from an intimate mixture in air suspension, said web comprising cement particles, staple reinforcing fiber, silica, and water, compressing and densifying said web and then curing the thus obtained densified web by steam induration to harden the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

6. In the method of manufacturing fiber-cement sheets which comprises forming a web upon a felting member from an intimate mixture in air suspension, said web comprising cement particles, staple reinforcing fiber, silica, and water in amount approximately 7 to 25% by weight of the uncured densified web, compressing and densifying said web and then curing the thus obtained densified web by steam induration to harden the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

7. The method of manufacturing normal cured fiber-cement sheets which comprises forming a web upon a felting member from an intimate mixture in air suspension, said web comprising cement particles, staple reinforcing fiber, and water, compressing and densifying said web at a plurality of stages wherein the initial stage exerts upon said web approximately 200 to 2000 lbs. per lineal inch and the subsequent stage exerts upon said web approximately 1,500 to 6,000 lbs. per lineal inch, with the pressure exerted by the subsequent stage being always greater than the pressure exerted by the initial stage, and then air-curing the thus obtained densified web to harden the cement therein.

8. The method of manufacturing normal cured fiber-cement sheets which comprises forming a web upon a felting member from an intimate mixture in air suspension, said web comprising cement particles, staple reinforcing fiber, and water in amount approximately 7 to 25% by weight of the uncured densifying web, compressing and densifying said web at a plurality of stages wherein the initial stage exerts upon said web approximately 200 to 2,000 lbs. per lineal inch and the subsequent stage exerts upon said web approximately 1,500 to 6,000 lbs. per lineal inch, with the pressure exerted by the subsequent stage being always greater than the pressure exerted by the initial stage, and then air-curing the thus obtained densified web to harden the cement therein.

9. In the method of manufacturing granule surfaced normal cured fiber-cement sheets which comprises forming a web upon a felting member from an intimate mixture in air suspension, said web comprising cement particles, staple reinforcing fiber, and water, applying granules to the surface of said web, compressing and densifying said web at a plurality of stages wherein the initial stage exerts upon said web approximately 200 to 2,000 lbs. per lineal inch and the subsequent stage exerts upon said web approximately 3,000 to 6,000 lbs. per lineal inch, and then air-curing the thus obtained densified web to harden the cement therein.

10. In the method of manufacturing fiber-cement sheets which comprises forming a web upon a felting member from an intimate mixture in air suspension, said web comprising cement particles, asbestos fiber in amount up to approximately 50% by weight of the uncured densified web, and water, compressing and densifying said web, and then curing the thus obtained densified web by hardening the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

11. In the method of manufacturing fiber-cement sheets which comprises forming a web upon a felting member from an intimate mixture in air suspension, said web comprising cement particles, asbestos fiber in amount up to approximately 50% by weight of the uncured densified web, and water, compressing and densifying said web and then curing the thus obtained densified web by steam induration to harden the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

12. The method of manufacturing normal cured fiber-cement sheets from an intimate mixture formed as a layer from an air suspension upon a felting member to form a web, said web comprising cement particles, asbestos fiber in amount up to approximately 50% by weight, and water, comprising the steps of compressing and densifying said web at a plurality of stages wherein the initial stage exerts upon said web approximately 200 to 2,000 lbs. per lineal inch and the subsequent stage exerts upon said web approximately 1,500 to 6,000 lbs. per lineal inch, with the pressure exerted by the subsequent stage being always greater than the pressure exerted by the initial stage, and then air-curing the thus obtained densified web to harden the cement therein.

13. In the method of manufacturing granule surfaced fiber-cement sheets which comprises forming a web upon a felting member from an intimate mixture in air suspension, said web comprising cement particles, asbestos fiber in amount up to approximately 50% by weight of the uncured densified web, and water, applying granules to the surface of said web, compressing and densifying said web and then curing the thus obtained densified web by steam induration to harden the cement therein, the improvement which comprises compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage.

14. The method of manufacturing granule surfaced normal cured fiber-cement sheets which comprises forming a web upon a felting member from an intimate mixture in air suspension, said web comprising cement particles, asbestos fiber in amount up to approximately 50% by weight, and water, applying granules to the surface of said web, compressing and densifying said web at a plurality of stages wherein the initial stage exerts upon said web approximately 200 to 2,000 lbs. per lineal inch and the subsequent stage exerts upon said web approximately 3000 to 6000 lbs. per lineal inch, and then air-curing the thus obtained densified web to harden the cement therein.

15. The method of manufacturing smooth surfaced fiber-cement sheets which comprises forming a web upon a felting member from an intimate mixture in air suspension, said web comprising cement particles, staple reinforcing fiber, and water, applying to the surface of said web a water laid felt of cement particles and staple reinforcing fibers, compressing and densifying said web at a plurality of stages wherein the initial stage exerts upon said web approximately 200 to 2000 lbs. per lineal inch and the subsequent stage exerts upon said web approximately 1500 to 6000 lbs. per lineal inch, with the pressure exerted by the subsequent stage being always greater than the pressure exerted by the initial stage, and then curing the thus obtained densified web by hardening the cement therein.

References Cited in the file of this patent

UNITED STATES PATENTS

| | | |
|---|---|---|
| 2,167,440 | Mason | July 25, 1939 |
| 2,215,244 | Linzell | Sept. 17, 1940 |
| 2,230,880 | Brown | Feb. 4, 1941 |
| 2,445,210 | Colton | July 13, 1948 |
| 2,446,782 | Otis et al. | Aug. 10, 1948 |